(12) United States Patent
Grunwald et al.

(10) Patent No.: US 9,012,539 B2
(45) Date of Patent: Apr. 21, 2015

(54) METHOD FOR REDUCING THE EMISSION OF ALDEHYDES AND VOLATILE ORGANIC COMPOUNDS OF WOOD MATERIALS

(75) Inventors: Dirk Grunwald, Braunschweig (DE); Joachim Hasch, Berlin (DE)

(73) Assignee: Kronotec AG, Luzern (CH)

( * ) Notice: Subject to any disclaimer, the term of this patent is extended or adjusted under 35 U.S.C. 154(b) by 66 days.

(21) Appl. No.: 12/671,821

(22) PCT Filed: Aug. 8, 2008

(86) PCT No.: PCT/EP2008/006584
§ 371 (c)(1),
(2), (4) Date: Apr. 27, 2010

(87) PCT Pub. No.: WO2009/021702
PCT Pub. Date: Feb. 19, 2009

(65) Prior Publication Data
US 2011/0237713 A1 Sep. 29, 2011

(30) Foreign Application Priority Data
Aug. 10, 2007 (DE) .......................... 10 2007 038 041

(51) Int. Cl.
*B29C 47/00* (2006.01)
*C08L 97/02* (2006.01)
*B27N 1/00* (2006.01)
*C08H 8/00* (2010.01)

(52) U.S. Cl.
CPC ................. *C08L 97/02* (2013.01); *B27N 1/003* (2013.01); *C08H 8/00* (2013.01)

(58) Field of Classification Search
CPC ............................... B27N 1/003; C08L 97/02
USPC .................................................... 524/13, 14
See application file for complete search history.

(56) References Cited

U.S. PATENT DOCUMENTS

| | | | |
|---|---|---|---|
| 557,837 A | 4/1896 | Lapp | |
| 4,033,913 A * | 7/1977 | Sunden | 524/14 |
| 4,409,375 A * | 10/1983 | Hartman et al. | 525/505 |
| 4,608,408 A * | 8/1986 | Hood et al. | 524/15 |
| 4,684,690 A * | 8/1987 | Kraus et al. | 524/419 |
| 4,814,422 A * | 3/1989 | Diem et al. | 528/230 |
| 4,892,588 A | 1/1990 | Dilling et al. | |
| 5,578,371 A | 11/1996 | Taylor et al. | |
| 6,028,133 A * | 2/2000 | Peek et al. | 524/276 |
| 6,420,034 B1 * | 7/2002 | Takahashi et al. | 428/423.1 |
| 6,749,949 B2 * | 6/2004 | Ljungar et al. | 428/524 |
| 8,043,383 B2 * | 10/2011 | Tutin et al. | 8/115.51 |
| 2004/0250907 A1 * | 12/2004 | Nasli-Bakir et al. | 144/332 |
| 2008/0038971 A1 * | 2/2008 | Tutin et al. | 442/59 |
| 2008/0286472 A1 * | 11/2008 | Tutin et al. | 427/350 |
| 2009/0130474 A1 * | 5/2009 | Ishimoto et al. | 428/537.1 |
| 2009/0145564 A1 * | 6/2009 | Seifert et al. | 162/63 |

FOREIGN PATENT DOCUMENTS

| | | |
|---|---|---|
| DE | 32 22 195 | 12/1983 |
| DE | 3427694 | 2/1986 |
| DE | 195 32 719 | 9/1995 |
| DE | 697 11 424 | 11/2002 |
| DE | 101 60 316 | 9/2004 |
| DE | 10 2005 019 627 | 10/2006 |
| EP | 0 367 389 | 5/1990 |
| JP | 06293009 | 10/1994 |
| JP | 10000603 | 1/1998 |
| JP | 10076505 | 3/1998 |
| JP | 10119010 | 12/1998 |
| JP | 11333813 | 12/1999 |
| JP | 2001193188 | 7/2001 |
| JP | 2006062157 | 3/2006 |
| JP | 2006514587 | 5/2006 |
| JP | 2007038659 | 2/2007 |
| JP | 2007083729 | 4/2007 |
| RU | 2252867 C1 | 5/2005 |
| SU | 1600622 A3 | 10/1990 |
| WO | 02/072323 | 9/2002 |
| WO | WO-02072323 A1 | 9/2002 |
| WO | 2007/012350 | 1/2007 |

OTHER PUBLICATIONS

Machine translation of DE 10160316, 2012.*
Williams Encyclopedia of Polymer Science and Technology. Copyright John Wiley & Sons, Inc., vol. 1, 340-371, 2002.*
Wodzinski et al. Appl. Environ. Microbiol. 1978, 35(4), 718-723.*
Russian Patent Office Action for Appl. 2010108453/05(011939) received on Apr. 10, 2012 (with English translation).
Encyclopedia of Polymers, Soviet Encyclopedia (date unknown).
Chemical Encyclopedia, vol. 1, Soviet Encyclopedia, Moscow, 1988.
Chemical Encyclopedia, vol. 2, Soviet Encyclopedia, Moscow, 1990.
International Preliminary Report for corresponding International Application No. PCT/EP2008/006584.

* cited by examiner

Primary Examiner — Liam J Heincer
(74) Attorney, Agent, or Firm — Andrew M. Calderon; Roberts Mlotkowski Safran & Cole, P.C.

(57) ABSTRACT

The present invention relates to a method for the production of wood material made of fragmentation products containing lignocelluloses, wherein these wood materials have a reduced emission of volatile organic compounds, aldehydes, particularly formaldehyde. Specifically, the invention relates to methods for the production of wood materials having reduced emission of volatile organic compounds and aldehydes, wherein a certain combination of compounds is utilized in order to prevent the emission of volatile organic compounds and aldehydes, particularly formaldehydes, from the produced wood material. The present invention further relates to wood material that can be produced according this method, particularly OSB panels, particle board, and MDF panels. Finally, the present invention provides compositions suitable in the treatment of wood material to reduce the emission of aldehydes, particularly formaldehyde and volatile organic compounds.

17 Claims, No Drawings

METHOD FOR REDUCING THE EMISSION OF ALDEHYDES AND VOLATILE ORGANIC COMPOUNDS OF WOOD MATERIALS

The present invention relates to the production of wood-base materials from lignocellulose-containing comminution products, these wood-base materials having reduced emission of volatile organic compounds (VOC) and here in particular of aldehydes, but also formaldehyde. More specifically, the present invention relates to methods for the production of wood-base materials having reduced emission of volatile organic compounds and optionally formaldehyde, a certain combination of compounds being used which prevent the emission of volatile organic compounds and formaldehyde from the wood-base material produced. Furthermore, with this method, the present invention relates to wood-base materials, in particular OSB boards, particle boards and MDF boards, which can be produced. Finally, the present invention provides compositions which, in the treatment of wood-base materials, are suitable for reducing the emission of formaldehyde and volatile organic compounds, and the corresponding use thereof.

PRIOR ART

Lignocellulose or lignocellulose-containing materials, such as wood and wood comminution products and wood-base materials produced therefrom, such as wood-base material boards, contain, inter alia, volatile organic compounds (VOC) and very volatile organic compounds (VVOC), such as formaldehyde. All volatile organic substances whose retention time in gas chromatography is between C6 (hexane) and C16 (hexadecane) are subsumed under volatile organic compounds. The very volatile organic compounds include, inter alia, also formic acid and formaldehyde. The expression aldehydes as used here comprises not only the volatile compounds but also all other aldehydes, in particular formaldehyde, unless stated otherwise.

Volatile organic compounds and very volatile organic compounds occur in different chemical composition and amounts, depending on the type and the state of the lignocelluloses, such as the type of wood, the duration of storage, the storage conditions of the wood or of the comminution products of the lignocelluloses. The VOCs originate substantially from extracts of the lignocelluloses, for example of the wood or conversion products. Prominent representatives thereof are substances such as alpha-pinene, beta-pinene, delta-3-carene. These constituents occur especially in the wood of coniferous trees. Conversion products which occur, for example during the storage and the processing of the wood and of the comminution products are, for example, pentanal and hexanal. Especially coniferous woods from which predominantly particle boards, medium-density fiber boards (MDF) or OSB boards are produced contain large amounts of resin and fats which lead to the formation of volatile organic terpene compounds and aldehydes. In some cases, these substances also form as a result of degradation of the main constituents of the wood, such as lignin, cellulose and hemicellulose. VOCs and aldehydes, such as formaldehyde, can also form during the use of certain adhesives for the production of wood-base materials.

It is a generally known fact that all wood-base materials, including particle boards, fiber boards and OSB boards, emit both formaldehyde and VOC and aldehyde to the room air. As already mentioned, these emissions are caused both by chemical degradation within the wood and by chemical degradation of the formaldehyde-containing adhesives used. In the case of the VOC emission, on the other hand, exclusively wood-related releases occur; these are divided into so-called primary emissions of readily volatile wood ingredients, such as terpenes, or chemical degradation products, such as acetic acid, and so-called secondary or tertiary emissions, e.g. higher aldehydes, such as pentanal, or higher carboxylic acids. These degradation products form as a result of long-lasting oxidative processes of wood ingredients, such as fatty acids, but also lignin, cellulose and hemicellulose.

The adhesives as are currently used in the production of wood-base materials, such as OSB boards, medium-density fiber boards, etc., include aminoplast adhesives, such as urea-formaldehyde adhesives (UF adhesives), melamine-urea-phenol-formaldehyde adhesives (MUPF adhesives) or melamine-urea-formaldehyde adhesives (MUF adhesives). Further adhesives, as are typically used in the case of wood-base materials, comprise adhesives based on diisocyanates (PMDI), polyurethane adhesives, phenol-formaldehyde adhesives (PF adhesives) and/or tannin-formaldehyde adhesives (TF adhesives) or mixtures thereof. In the fiber board sector, for example, mainly aminoplast adhesives are used. Release of VOCs and of formaldehyde takes place both during the production of the wood-base materials and after the production thereof and during their use. During fiber board production, partial chemical degradation of the wood may occur, for example during the thermal hydrolytic treatment of the lignocellulose-containing materials. The resulting, readily volatile compounds, such as aldehydes and acids, then emit during the subsequent production process or during later use of the wood-base materials produced. They may also have an adverse effect on the adhesive bond strength and hence adversely influence the properties of the wood-base materials produced.

For the abovementioned reasons, it was the object of the present invention, for the use of chemical additives, to limit the VOC emission (in particular of the aldehydes) and preferably also the formaldehyde emission of wood-base materials to a low level. There should be as little intervention as possible in the technological process of the production of wood-base materials, in order to avoid complicated technological adaptations or conversion measures. Moreover, chemical disturbance of the process must also be avoided. For the use of the customary formaldehyde-containing adhesives, the curing thereof takes place at high temperatures and high pressure. Further important characteristics are the pH as a measure of the presence of acids or bases and the buffer capacity which as a measure of the resistance to a pH change (e.g. by addition of curing agent). A disturbance of the necessary pH, which, for example is from 5 to 6 in the case of acid-curing aminoplast adhesives or in the range from pH 8 to 9 in the case of alkali-curing PF adhesives or in the range from 6 to 8 in the case of neutral-curing PMDI adhesives, and of the existing buffer capacity should therefore as far as possible be avoided. Furthermore, it is an object of the present invention to minimize the emission of aldehydes and VOC over the total period, i.e. during the production and the subsequent, longer use of the wood-base materials produced.

DESCRIPTION OF THE INVENTION

The object is achieved by adding a specific composition to the lignocellulose-containing comminution products in order, by reaction with the VOCs and the aldehydes, to change these so that they are no longer emitted from the comminution products or from the wood-base materials produced from these comminution products. The resulting compounds have such a high molecular weight that they are no longer volatile and therefore no longer contribute, even in the long term, to the VOC emissions or aldehyde emissions.

As stated, the pH and the buffer capacity of the wood-base materials also play an important role here. It is therefore important, not only during treatment but also in the completed wood-base material, to keep both the pH and the buffer capacity to appropriate values so that as little conversion to VOCs and aldehydes as possible occurs during the use of the wood-base materials. The pH should preferably be set in a range from 5 to 6 or from 6 to 9, depending on the adhesive used. In other words, for example in an optimum pH range which is ensured by the addition, according to the invention, of the additive, not only is a reduction of the emission of the VOC possible but this system also has no adverse effects on the processing methods, such as precuring of the adhesive, insufficient curing, poor adhesive bonding quality, etc., as occur on changes of the pH.

It is found here that, on addition of at least two components which are selected from two groups i) to iv) different from one another, as mentioned below, the disadvantages described are reduced or limited. By means of the mixture, the pH and the buffer capacities can be brought to a technologically expedient level without there being any disturbance of the production process or a subsequent chemical degradation of the constituents of the wood-base materials. In contrast to the prior art, for example WO 2007/012350 or DE 101 60 316, in which only one component (bisulfite) is used, which changes both the pH and the buffer capacity of the constituents of the finished wood-base material as well as the individual constituents during production, this combination of at least two components permits a limitation of the changes in the pH and buffer capacity.

The use in each case of one component or of mixtures which adversely affect the pH, i.e. shift the pH so that the pH range optimum for the adhesive is departed from, as a scavenger for VOCs and aldehydes is associated with the following disadvantages: there is the danger of precuring or of inhibition of the adhesives used, before the actual production step of bonding, such as hot pressing. Furthermore, there is the danger of insufficient curing during the hot pressing, in particular if a sulfite solution having an alkaline pH above 8 or bisulfite solution having an acidic pH below 5 is used. Finally, there is the danger of chemical degradation of the adhesive and/or of wood constituents and/or wood ingredients by hydrolysis under the influence of free or latent acids and/or alkalis remaining in the wood-base material.

A further disadvantage of WO 2007/012350 is the limitation to fiber boards, since the bisulfite is added to the chips before the refiner, whereas the present invention can be used for all wood-base materials. A further disadvantage of this method is the introduction in the refiner, since in this way the losses owing to evolution of $SO_2$ vapor and owing to the press water are particularly high. While WO 2007/012350 relates exclusively to formaldehyde, it was surprisingly found that, by the use of at least two components, the emissions of volatile organic compounds can also be effectively reduced.

In contrast, the additive is added here only after the comminution of the comminution products, for example after the refiner in the case of fibers. Preferably, the additives are applied immediately after the introduction of the adhesives. The additives therefore do not serve for digesting the wood.

By combining at least two components which are selected from two groups of i) to iv) differing from one another, these problems can be reduced. A substantial advantage of the present invention is therefore the stabilization of the pH and maintenance of the buffer capacity in order thus to reduce the emission of VOC and aldehydes, such as formaldehyde.

The groups i) to iv) are the following: the group i) comprises hydrogen sulfite salts, for example of the general formula $MeHSO_3$ or $Me(HSO_3)_2$, Me being an alkali metal, alkaline earth metal or ammonium ion, such as sodium hydrogen sulfite, ammonium hydrogen sulfite, lithium hydrogen sulfite, potassium hydrogen sulfite, calcium hydrogen sulfite, magnesium hydrogen sulfite etc.

Sodium hydrogen sulfite or ammonium hydrogen sulfite is preferably used as hydrogen sulfite salt, in particular ammonium hydrogen sulfite.

Compounds of group ii) sulfite salts comprise sulfite salts, for example compounds of the general formula $MeSO_3$ or $Me(SO_3)_2$, Me being an alkali metal, alkaline earth metal or ammonium ion and optionally two Me ions being present, as in the case of alkali metal or ammonium sulfites. Suitable sulfite salts are in particular sodium sulfite, potassium sulfite, magnesium sulfite, calcium sulfite, ammonium sulfite, very particularly ammonium sulfite.

These components of groups i) and ii), the hydrogen sulfite salts and sulfite salts, react, for example, rapidly with aldehyde compounds, such as formaldehyde, with formation of, for example, sparingly soluble formaldehyde hydrogen sulfite or formaldehyde sulfite addition compounds. As a result, the emissions are reduced very effectively and in the short term. Moreover, said components have antioxidant properties and can therefore suppress the VOC emissions which are caused by oxidation. The components furthermore have buffering properties and make it possible to stabilize the pH of the wood-base material and also the cured adhesive and thus to avoid a hydrolysis both of the wood-base material and of the adhesive. Sulfite as well as hydrogen sulfite components furthermore react with isolated double bonds, as are present, for example, in terpenes, fats or fatty acids, by reduction or addition with these compounds.

In a preferred embodiment, both at least one hydrogen sulfite salt and at least one sulfite salt are added to the comminution products in the method according to the invention. The salts used are preferably ammonium hydrogen sulfite and/or sodium hydrogen sulfites or sodium sulfite and/or ammonium sulfite. The use of a combination of ammonium sulfite/ammonium hydrogen sulfite is very particularly preferred.

By suitable combination of sulfite and hydrogen sulfite, it is possible to achieve the desired pH and to act as a buffer in this range. In particular, for example, equimolar mixtures of sulfites/hydrogen sulfites are therefore advantageous for showing a buffer capacity in the neutral range. In particular, a 1:1 mixture of ammonium sulfite/ammonium hydrogen sulfite proved to be particularly suitable. However, other combinations in the range from 1:3 to 3:1 can also be used, in particular if a pH optimum for the further procedure can be achieved thereby. This can be easily carried out by suitable measurements on the adhesive used (e.g. gelling time measurements, curing time measurements) beforehand.

The group iii) comprises urea and urea derivatives, such as monomethylolurea, methyleneurea. Urea is preferably used.

Urea likewise reacts with formaldehyde with formation of mono- and dimethylolurea. This reaction takes place very slowly and therefore permits a long-term reduction of the formaldehyde level in the wood-base materials. The use of urea alone is, however, not expedient since the reaction with formaldehyde takes place very slowly and is an equilibrium reaction, so that formaldehyde can also be released at a later time.

In a further preferred embodiment, a combination of a component of group iii) and at least one component from groups i) and ii) is added to the comminution products in the method according to the invention. Owing to the different modes of reaction or reaction times of the added components with respect to formaldehyde and VOC, both short-term and long-term emission of VOC and formaldehyde can be changed and the properties of the wood-base materials thus optimized.

The group iv) comprises alkali metal, alkaline earth metal and ammonium hydroxides. Sodium hydroxide and ammonium hydroxide are preferably used. Further suitable hydroxides include potassium hydroxide, magnesium hydroxide, calcium hydroxide. These hydroxide components of group iv) are required primarily for adjusting the pH but may prevent the hydrolytic degradation of acid-curing adhesives, such as UF, MUF and MUPF adhesives. In preferred embodiments, at least in each case one component from the groups i) and ii) differing from one another, urea and/or alkali metal, alkaline earth metal or ammonium hydroxides are added to the comminution products. As a result, the optimization of the buffer capacities of the wood-base materials obtained and a particularly suitable pH are achieved. Consequently, degradation processes of the wood-base materials and of the binders present therein are reduced over time.

A combination of a hydrogen sulfite salt, a sulfite salt and optionally urea or urea derivative is particularly preferably used.

Preferably, the at least one hydrogen sulfite salt is added in an amount of 0.1% by weight, based on absolutely dry lignocellulose. The amount of hydrogen sulfite salt is preferably from 0.1% by weight to 5% by weight, based on absolutely dry lignocellulose. The amount of sulfite salt is likewise at least 0.1% by weight, based on absolutely dry lignocellulose, such as from 0.1% by weight to 5% by weight. Preferably, amounts of, in each case, from 0.2% by weight to 1.5% by weight of sulfite or hydrogen sulfite are used, for example a mixture with about 50% solids content with 1%, based on absolutely dry wood, is metered. The amount of urea is preferably in the range from 0.5% by weight to 5% by weight, based on absolutely dry lignocellulose. The amount of alkali metal, alkaline earth metal and ammonium hydroxide is preferably in the range from 0.1% by weight to 3% by weight, based on absolutely dry lignocellulose.

The present invention furthermore relates to compositions, which is also referred to below as scavenger solution, for the treatment of wood-base materials and the reduction of the emission of volatile organic compounds (VOC) and aldehydes included therein, but also formaldehyde, comprising at least, in each case, one component from:
i) hydrogen sulfite salt
ii) sulfite salt
optionally with a further addition of at least one component of
iii) and/or iv):
iii) urea and urea derivatives and
iv) alkali metal, alkaline earth metal or ammonium hydroxide.

The sulfite or hydrogen sulfite salt is preferably one derived from sodium and ammonia. The hydroxide compound is preferably sodium hydroxide.

A further preferred embodiment relates to a composition of the abovementioned type, in which at least one hydrogen sulfite salt and sulfite salt is used in combination with urea and/or a urea derivative.

The scavenger solution can be used in the production of all wood-base materials, the addition being effected according to the method according to the invention, expediently via plants customary in the industry for binder metering, such as gluing drum, blowline gluing or dry gluing. Furthermore, according to the invention, the addition of the solution to the mat via nozzles is possible directly before the hot press. Preferably, the additive is not mixed with the adhesive but is added to the comminution products before or after application of the adhesive, immediately before the hot pressing. Said adhesive is not limited only to formaldehyde-containing adhesives but also includes all other thermoplastic or thermosetting adhesives which are used in the case of wood-base materials, such as, for example, PMDI.

A composition containing
from 0 to 90% by weight of ammonium sulfite
from 0 to 90% by weight of ammonium hydrogen sulfite
from 0 to 90% by weight of sodium hydrogen sulfite
from 0 to 90% by weight of sodium sulfite
from 0 to 90% by weight of urea
from 0 to 10% by weight of sodium hydroxide
is particularly preferred, components from the groups i) and ii) being present in an amount of at least 0.1% by weight.

Finally, the present invention provides wood-base materials obtainable according to the method according to the invention. These wood-base materials are distinguished by a reduced emission of volatile organic compounds, in particular the aldehydes, including formaldehyde. They are in particular fiber boards, such as HDF or MDF, or OSB boards.

The invention is explained in more detail below with the aid of examples, without it being limited thereto.

EXAMPLE 1

Production of Low-Emission HDF

HDF boards were produced according to known methods, a 1:1 mixture of ammonium sulfite solution (35% strength solution) and ammonium hydrogen sulfite solution (70% strength, 45% proportion of $SO_2$) having been metered directly via a separate nozzle in the blowline into the wood-base materials according to the invention. The values obtained for formaldehyde release, determined according to EN 120 or EN 717-2, are shown in table 1.

TABLE 1

| Sample/addition of solution, based on absolutely dry wood | Density mm | Formaldehyde release according to EN 120 mg/100 g | Gas analysis according to EN 717-2 mg/m2 * h | Addition of urea, based on absolutely dry wood % |
|---|---|---|---|---|
| 0/0% | 6.8 | 6.83 | 4.39 | 2.0 |
| 1/2.5% | 6.9 | 1.32 | 2.88 | 2.0 |
| 2/2.5% | 6.9 | 0.85 | 2.94 | 4.0 |

As is evident from table 1, the formaldehyde values are substantially reduced.

EXAMPLE 2

Production of Low-Emission Particle Boards

Particle boards were produced according to known methods. A 1:1 mixture of ammonium sulfite solution (35% strength) and ammonium hydrogen sulfite solution (70% strength, 45% proportion of $SO_2$) was metered via a separate nozzle into the gluing drum. 4 kg of solution were used per 100 kg of adhesive. Furthermore, urea was added in an amount of 0.5% by weight, based on absolutely dry wood. Thereafter, the formaldehyde release of the samples was determined according to EN 120 and determined by the desiccator method according to JIS A 5908.

The values are shown in table 2.

TABLE 2

| Sample | Thickness mm | Formaldehyde release according to EN 120 mg/100 g | Desiccator value according to JIS A 5908 mg/l |
|---|---|---|---|
| Without addition | 17.1 | 5.43 | 1.59 |
| With addition | 17.1 | 3.33 | 1.16 |

It is evident from table 2 that the formaldehyde release can be drastically reduced.

EXAMPLE 3

Production of Low-Emission OSB

OSB boards were produced according to known methods, a 1:1 mixture of ammonium sulfite solution (35% strength) and ammonium hydrogen sulfide solution (70% strength) having been metered in an amount of 1%, based on absolutely dry wood, into the comminution products in the wood-base materials according to the invention. This solution was added via the gluing layer (from Coil, Canada) both to the strands of the covering layer and to the strands of the middle layer. The adhesive for the covering layer (MUPF adhesive) and the adhesive for the middle layer (PMDI) were metered via separate nozzles.

The values obtained for the aldehyde release, determined according to DIN EN ISO 16000, are shown in table 3.

In comparison, the results of a control board which was not treated with the composition according to the invention are shown in table 4.

TABLE 3

Results of the aldehyde determination of the OSB board according to the invention

| Substance | Concentration in µg/m3 | | | Limit of determination |
|---|---|---|---|---|
| | 3 d | 7 d | 28 d | |
| Formaldehyde | 2.9 | 3.1 | 2.9 | 0.1 |
| Acetaldehyde | 6.9 | 9.1 | 5.7 | 0.1 |
| Propanal | 1.0 | 1.0 | 1.0 | 0.2 |
| Butanal | <0.2 | <0.2 | <0.2 | 0.2 |

TABLE 4

Results of the aldehyde determination of the reference sample

| Substance | Concentration in µg/m3 | | | Limit of determination |
|---|---|---|---|---|
| | 3 d | 7 d | 28 d | |
| Formaldehyde | 21.3 | 18.3 | 13.6 | 0.1 |
| Acetaldehyde | <0.1 | 31.0 | 26.3 | 0.1 |
| Propanal | 18.0 | 19.7 | 13.1 | 0.2 |
| Butanal | 4.7 | 5.5 | 5.1 | 0.2 |

In the comparison of the total amount of VOC over a period of 28 days, the following values were obtained:

TABLE 5

| | Concentration in µg/m² | | |
|---|---|---|---|
| | 3 d | 7 d | 28 d |
| OSB board | 3362 | 1652 | 512 |
| Reference sample | 3468 | 1984 | 986 |

As is evident from the examples, it is possible according to the invention to reduce the emissions of VOC but also the formaldehyde emissions substantially with the aid of the composition according to the invention. The wood-base materials thus obtained are distinguished in later use by reduced VOC emissions and here in particular by reduced aldehyde emission. However, the formaldehyde emission is also reduced.

The invention claimed is:
1. A method for the production of wood-base materials from lignocellulose, comprising:
   provision of lignocellulose-containing comminution products;
   provision of adhesive based on diisocyanates;
   mixing of the lignocellulose-containing comminution products with the adhesive;
   reducing emission of volatile organic compounds (VOC) during pressing of the mixture with heat treatment and also from wood-based boards produced from the lignocellulose-containing comminution products, by a combination of i) and ii) below, whereby the combination of i) and ii) have a buffer capacity, added to the comminution products before the pressing and after defibration or chipping, optionally with further addition of at least one component from the groups iii) and iv) below, the groups i) to iv) being:
   i) hydrogen sulfite salts,
   ii) sulfite salts,
   iii) ureas or urea derivatives, and
   iv) alkali metal, alkaline earth metal or ammonium hydroxides;
   wherein the molar ratio of ii) sulfite salts to i) hydrogen sulfite salts is in the range from 1:3 to 3:1 and a pH of ii) sulfite salts/i) hydrogen sulfite salts is in a range of from 5 to 6.
2. The method as claimed in claim 1, wherein the combination of i) hydrogen sulfite salts and ii) sulfite salts together with at least one component from iii) ureas or urea derivatives is added to the comminution products before the pressing.
3. The method as claimed in claim 1, wherein the wood-base materials are produced from wood chips, wood strands and wood fibers.
4. The method as claimed in claim 1, wherein the wood-base materials are wood boards.
5. The method as claimed in claim 4, wherein the wood-base materials are particle boards.
6. The method as claimed in claim 4, wherein the wood-base materials are MDF boards.
7. The method as claimed in claim 4, wherein the wood-base materials are OSB boards.
8. The method as claimed in claim 1, wherein at least one of ammonium hydrogen sulfite and sodium hydrogen sulfite are added as the hydrogen sulfite salt and at least one of sodium sulfite and ammonium sulfite are added as the sulfite salt.

9. The method as claimed in claim 1, wherein the amount of sulfite salt is from 0.1% by weight to 5% by weight of solid, based on absolutely dry lignocellulose.

10. The method as claimed in claim 1, wherein the amount of hydrogen sulfite salt is from 0.1% by weight to 5% by weight of solid, based on absolutely dry lignocellulose.

11. The method as claimed in claim 1, wherein the amount of urea is from 0.5% by weight to 5% by weight of solid, based on absolutely dry lignocellulose.

12. The method as claimed in claim 1, wherein the amount of alkali metal, alkaline earth metal or ammonium hydroxide is from 0.1% by weight to 3% by weight of solid, based on absolutely dry lignocellulose.

13. A wood-base material obtained by a method as claimed in claim 1.

14. The wood-base material as claimed in claim 13, wherein said wood-base material is fiber boards.

15. The wood-base material as claimed in claim 13, wherein said wood-base material are particle boards.

16. The wood-base material as claimed in claim 13, wherein said wood-base material are OSB boards.

17. The wood-base material as claimed in claim 13, wherein said wood-base material is fiber comprising one of HDF and MDF boards.

* * * * *